United States Patent [19]

Bright

[11] 4,099,765
[45] Jul. 11, 1978

[54] CHANNEL-SHAPED GUIDING, SEALING AND FINISHING STRIPS

[75] Inventor: Robert G. Bright, Viersen, Germany

[73] Assignee: Draftex Development AG, Switzerland

[21] Appl. No.: 722,541

[22] Filed: Sep. 13, 1976

[30] Foreign Application Priority Data

Sep. 19, 1975 [GB] United Kingdom ............... 38643/75

[51] Int. Cl.² ............................ E06B 7/18; E06B 7/22
[52] U.S. Cl. ........................................ 296/93; 49/490; 428/136
[58] Field of Search ..................... 296/93; 49/440, 441, 49/490, 496; 428/136

[56] References Cited

U.S. PATENT DOCUMENTS 3,371,447 3/1968 Ruft ........................................ 49/490
3,993,819 11/1976 Fewkes ................................. 49/490

Primary Examiner—Philip Goodman
Attorney, Agent, or Firm—Leydig, Voit, Osann, Mayer & Holt, Ltd.

[57] ABSTRACT

A channel-shaped guiding, sealing or finishing strip, such as for use in vehicle bodies for sealing door flanges or windows, comprises a channel-shaped metal carrier covered with plastics or rubber material. The metal carrier is made up of a series of side-by-side generally U-shaped elements which are interconnected by short connecting links. The connecting links are each kinked or corrguated so as to enable the sealing strip to be stretched or compressed slightly.

11 Claims, 13 Drawing Figures

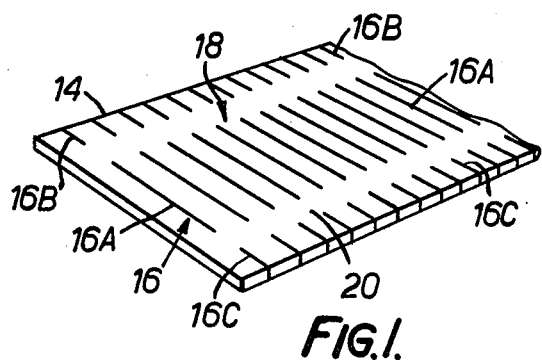
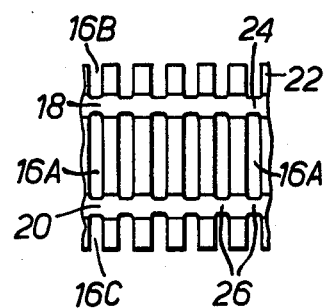
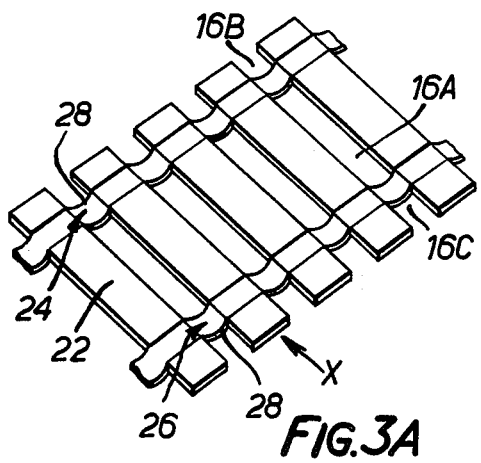
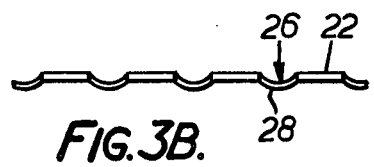
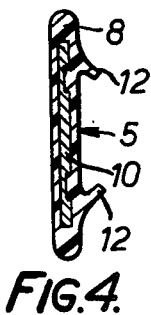
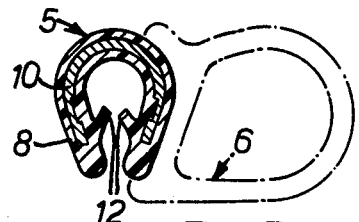
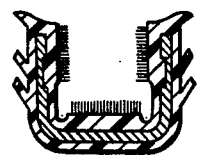

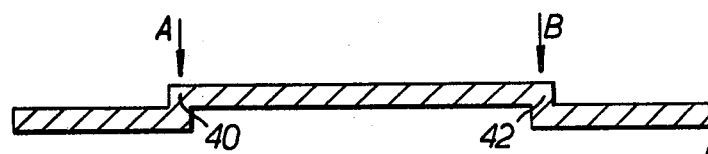
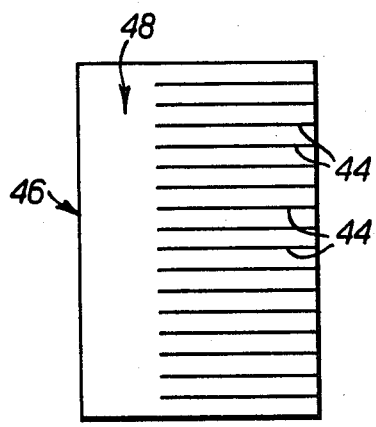
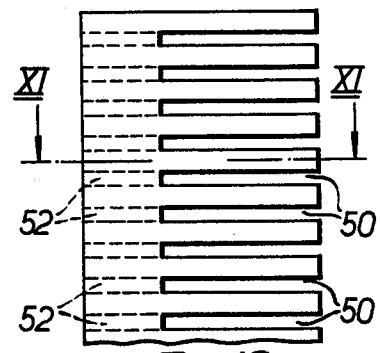
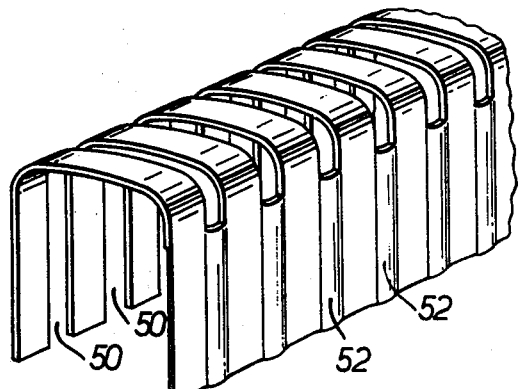

4,099,765

CHANNEL-SHAPED GUIDING, SEALING AND FINISHING STRIPS

BACKGROUND OF THE INVENTION

The invention relates to flexible channel-shaped guiding, sealing and finishing strips for use as draft excluding seals, beadings, or window channels, flange finishers (for covering welded flanges, for example), and the like. Such strips may hereinafter be referred to generically as "sealing strips", and are particularly, though not exclusively, for use in vehicle bodies.

It is known to make such channel-shaped strips by covering a metal "carrier" with flexible material such as plastics or rubber, as by extrusion. The metal carrier advantageously comprises a series of side-by-side generally U-shaped elements.

It is also known to interconnect the carrier elements to each other by means of short connecting links.

Such connecting links of course hold the carrier elements together while they are covered with the flexible covering material, but in the finished sealing strip they restrict its flexibility to some extent.

Another disadvantage of the connecting links is that they almost completely preclude the possibility of stretching or compressing the sealing strip lengthwise in use such as, for example, to take up tolerances on a vehicle body on which it is being fitted.

It is therefore also known to arrange the connecting links so that they are broken or removed after the process of covering the carrier elements with the flexible covering material. The absence of the connecting links in the finished product gives it considerably enhanced flexibility. However, it does have the disadvantage that the carrier elements are no longer positively located with reference to each other. When the sealing strip is bent around a curve, for example, this means that there is no positive location for the neutral bending axis and unsatisfactory bending may occur.

It is therefore an object of the invention to provide an improved sealing strip and an improved method of making such a sealing strip.

A more specific object of the invention is to provide a sealing strip in which the elements of the carrier thereof are interconnected to each other and thus positively located relative to each other but in a way which does not unduly restrict the flexibility, compressibility and stretchability of the sealing strip.

SUMMARY OF THE INVENTION

According to the invention, there is provided a method of making a channel-shaped sealing, guiding or finishing strip, comprising the steps of forming parallel side-by-side slits through and transversely of a metal blank but so as to leave an unslit region or regions extending longitudinally of the blank, thinning down the material of the blank along the or each unslit region so as to expand the slits into slots and thereby form a series of parallel side-by-side carrier elements extending transversely of the blank which are interconnected by short connecting links formed by portions of the unslit region or regions, forming in each connecting link a kink or corrugation extending out of the plane of the blank, forming the blank into channel shape so as to bend each element into generally U-shape, and applying a covering of flexible material over at least the outward surfaces of the carrier elements and connecting links.

According to the invention, there is also provided a channel-shaped guiding, sealing or finishing strip, comprising a series of parallel side-by-side generally U-shaped elements of resilient material interconnected by short connecting links to define a channel, each connecting link being kinked or corrugated and of reduced thickness as compared with the elements, and a channel-shaped covering of flexible material on at least the outward surfaces of the elements and links.

BRIEF DESCRIPTION OF THE DRAWINGS

Sealing strips embodying the invention, carriers embodying the invention for sealing strips, and methods according to the invention of making carriers and sealing strips, will now be described, by way of example only, with reference to the accompanying diagrammatic drawings in which:

FIG. 1 is a perspective view of a metal blank showing an early stage in the manufacture of a metal carrier;

FIG. 2 is a plan view of the carrier at a later stage in its manufacture;

FIG. 3A is a perspective view corresponding to FIG. 2 but showing the carrier after a further stage in manufacture;

FIG. 3B is a view looking in the direction of arrow X of FIG. 3A;

FIG. 4 is a section through a sealing strip at an early stage in its manufacture;

FIG. 5 is a section through the completed sealing strip;

FIG. 6 is a section through a completed sealing strip of different form;

FIGS. 7 and 8 show another method of preparing the blank used in FIG. 1;

FIGS. 9, 10 and 11 show a metal blank used in the manufacture of a modified form of carrier, FIGS. 9 and 10 being plan views showing the blank at different stages in the method, and FIG. 11 being a section on the line XI—XI of FIG. 10; and FIG. 12 shows the completed metal carrier from the blank of FIGS. 9 to 11.

DESCRIPTION OF PREFERRED EMBODIMENTS

FIG. 5 shows a perspective view of the completed sealing strip which is seen to comprise a gripping section 5 and, optionally, a sealing section 6. The gripping section 5 is made of generally channel-shaped plastics or rubber material 8 in which is embedded a channel-shaped core or carrier 10 which is advantageously made of metal. The sealing section 6 is preferably made of softer material than the plastics or rubber material 8, such as, for example, sponge rubber, and is adhesively attached to the outside of one wall of the gripping section 5. If the material of the sealing section is compatible with, or the same as, material 8, the two may be extruded simultaneously.

The inside facing walls of the channel of the gripping section 5 are advantageously provided with gripping ribs 12.

In use, the gripping section 5 is arranged to straddle a metal flange around a door or other opening in a motor vehicle body, and the gripping ribs 12 prevent inadvertent removal. The gripping section 5 supports the sealing strip on the flange so that the sealing section 6 is presented outwardly of the flange such that the door, for closing the opening, closes onto the sealing section 6 which provides a draught and weatherproof seal.

The carrier 10 is initially in the form of a rectangular metal blank 14 (FIG. 1) which may be 0.5 mm. thick and 30 mm. wide. Narrow slits 16 are then formed through the blank 14 at closely spaced intervals, each slit 16 being in three parts, a central part 16A and marginal parts 16B and 16C, the slits being arranged so as to leave unslit regions 18 and 20 extending longitudinally along the blank.

The slit blank of FIG. 1 is then subjected to a rolling operation which thins the blank down from 0.5 mm. to 0.3 or 0.2 mm. but only along the regions 18 and 20. As shown in FIG. 2, the effect is to expand the slits 16 into slots which may be 2 or 3 mm. wide, say. In this way, the carrier is formed to comprise transverse carrier elements 22 separated by short connecting links 24 and 26.

The carrier of FIG. 2 is then subjected to a forming operation which converts it into the form shown in FIGS. 3A and 3B, with each interconnecting link 24, 26 being given a kink or corrugation 28. This action may reduce the gaps between the carrier elements 22 from 2 or 3 mm. to 1.5 mm. Each corrugation extends out of the plane of the blank surface by about 1 mmm.

By means of a suitable extruder, the carrier of FIGS. 3A and 3B is then embedded in plastics or rubber material 8, as shown in FIG. 4, the carrier still being in the form shown in FIGS. 3A and 3B. It will be noted that the material 8 covers the corrugations 28.

The strip of FIG. 4 is then bent into channel-shaped form to produce the shape shown in FIG. 5, and thereafter the sealing section 6 may be attached.

In use, the corrugated links 24, 26 of the carrier in the finished sealing strip prevent excessive stretching of the sealing strip because they maintain a connection between adjacent carrier elements in the completed sealing strip. However, the corrugations 28 do allow some compression of the sealing strip and also bending thereof. During any bending which takes place, the connecting links hold the neutral bending axes of the sealing strip in predetermined positions (which would not be the case if the connecting links broke), and this is advantageous in that it enables a desired shape of curve to be achieved and prevents the sealing section 6 bending in an unacceptable manner.

It will be appreciated that the corrugations or kinks 28 may be applied to carriers of other forms. For example, they may be applied to carriers whose general form is as shown in FIG. 2 but in which the slots and connecting links are not formed by a rolling operation but by punching. Furthermore, the connecting links need not be positioned as shown in FIG. 2. There could, for example, be only a single row of connecting links, running centrally down the length of the carrier.

Instead, for example, there could be an additional row of connecting links running between the two rows shown in FIG. 2. In each case, the connecting links would all be corrugated or kinked.

Using a similar extrusion technique, the carriers described may also be incorporated in channels (window guide channels for example) which are arranged to be located in a mounting channel instead of on a mounting flange, as shown in FIG. 6.

In a modification, the extrusion process may be arranged so that the plastics or rubber material 8 does not completely cover the carrier but covers only the outside surface thereof (that is, the surface which is outermost in the finished sealing strip) and possibly also extends around the marginal edges of the carrier for a short distance. This reduces the amount, and hence the cost, of the material 8 which has to be used. The action of bending the coated carrier into channel form stresses the covering material 8. When the sealing strip is bent round a corner in fitting it to a vehicle body flange or the like, the built-in stress prevents the material on the inside of the radius from kinking and the stress becomes at least partially relieved.

FIGS. 7 and 8 show how the metal blank used in FIG. 1 may be prepared. As shown in FIG. 7 which is a cross-section, the blank is not flat but stepped at 40 and 42. The stepped blank is then subjected to a pressing or rolling operation as indicated by the two arrows A and B and the result is to produce the form shown in FIG. 8. Here, the blank has been flattened but the steps 40 and 42 have been converted into thickened portions. The blank is then slit as shown in FIG. 1, the unslit paths 18 and 20 coinciding with the thickened portions 40 and 42. After the rolling operation shown in FIG. 2, the thickened portions 40 and 42 will have been thinned down to approximately the same thickness as the remainder of the blank. In this way, unnecessary weakening along the rolled down paths 18, 20 is prevented.

It will be appreciated that a similar method may be used to provide preliminary thickening of the metal blank in whatever position needed.

FIG. 9 shows how slits 44 may be provided extending more than half way across a blank 46, so as to leave an unslit zone 48. The latter is then rolled down as shown in FIGS. 10 and 11 so as to open the slits 44 into slots 50. The connecting regions 52 in line with the slots 50 are then subjected to a corrugating or kinking operation, corresponding to that described above. The blank is then bent into U-form to provide the channel shape shown in FIG. 12, and is then covered with extruded plastics or rubber material so as, for example, to form a structure such as shown in FIG. 5 (alternatively, the blank may be covered with the extruded material while still in flat form, but after corrugation of the regions 52, and subsequently bent into channel form).

In all cases, it will be appreciated that the rolling down operation, to form the slits into slots, provides a desirable strain-hardening effect.

What I claim is:

1. A channel-shaped guiding, sealing or finishing strip structure, comprising a series of parallel side-by-side generally U-shaped elements each made of resilient flat metal strip, short resilient metal connecting links integral with and connecting the elements so that the latter define a channel, those regions of adjacent elements which are connected by each connecting link lying in a common plane and each connecting link being kinked or corrugated so as to curve out of the then back into the said common plane, and each connecting link being of reduced thickness as compared with the thickness of the elements in regions thereof immediately adjacent the said regions that are connected by the connecting links, and a channel-shaped covering of flexible material on at least the outward surfaces of the elements and links.

2. A sealing strip structure according to claim 1, in which the connecting links are arranged in at least one row extending longitudinally of the channel.

3. A strip structure according to claim 2, in which the connecting links are arranged in two said rows which are respectively positioned near to but spaced slightly from the distal ends of the legs of the U-shaped carrier elements.

4. A sealing strip structure according to claim 2, in which there is a single row of connecting links.

5. A strip structure according to claim 4, in which the links of the single row interconnect the carrier elements at the bases of their U-shapes.

6. A strip structure according to claim 4, in which the links of the single row interconnect one leg of each carrier element with the corresponding leg of the next carrier element.

7. A sealing strip structure according to claim 6, in which each connecting link has a height (measured perpendicularly to the length of the channel) substantially equal to the length of each carrier element leg.

8. A sealing strip structure according to claim 1, in which the covering completely encloses the carrier elements and connecting links.

9. A sealing strip structure according to claim 8, in which the covering defines at least one rib positioned on at least one of the inside walls of the channel and extending therealong.

10. A sealing strip structure according to claim 1, including a sealing portion of soft flexible material mounted on the covering material on the outside of and extending along the length of the channel.

11. A sealing strip structure according to claim 1, in which the thickness of each of the said regions that are connected by the connecting links is the same as the thickness of the connecting links.

* * * * *